H. C. JONES.
Grain Baskets.

No. 137,846.

Patented April 15, 1873.

Witnesses.

Inventor.

UNITED STATES PATENT OFFICE.

HORACE C. JONES, OF DOWAGIAC, MICHIGAN.

IMPROVEMENT IN GRAIN-BASKETS.

Specification forming part of Letters Patent No. 137,846, dated April 15, 1873; application filed February 4, 1873.

*To all whom it may concern:*

Be it known that I, HORACE C. JONES, of Dowagiac, in the county of Cass and State of Michigan, have invented a new and useful Mode or Manner of Constructing Stave Baskets; and the following is a full and exact description thereof, reference being had to the accompanying drawing making a part of this specification, in which—

Figure 2:
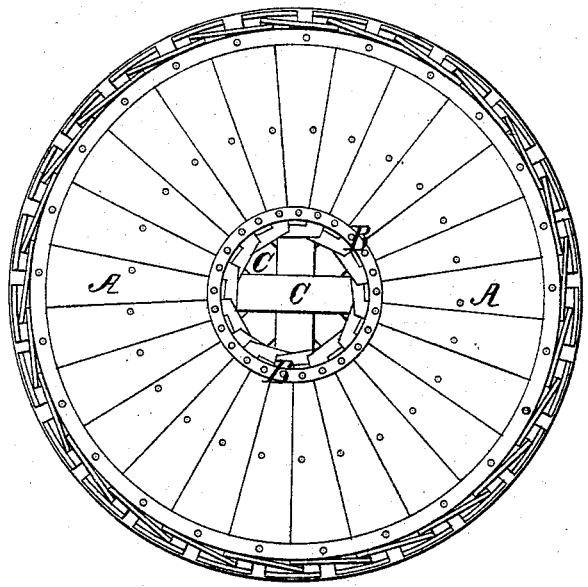
Figure 1:
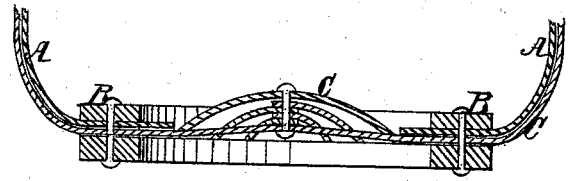

Figure 1 represents the bottom portion of an upright half-section of the basket; Fig. 2, a downward view and the arrangement of the series of staves forming its inside lining.

My said invention consists in so arranging an inside series of short staves as that they shall overlap each other along one of their edges and each alternate stave terminate at its lower end under the inside bottom hoop B B, while the others of the series extend beyond such point and terminate just within or near said hoop. In connection with my invention I use, for the outside series of staves, those of sufficient length to extend from the top of the basket down across the bottom and up to the top on the other side. The object of my invention is to relieve the central and raised portion of the bottom of the basket from the downward spring and pressure experienced in using staves which extend down to and terminate at or near such central point, and thereby render such portion less liable to settle out of shape.

By the use of my invention the sides of the basket can be made very strong without the accumulation of a like amount of additional material over or around the central part of the bottom, and the manufacturer is enabled to supply the market with a durable and cheaply-constructed basket suitable for handling coarse grain and other heavy materials for which baskets are required.

In the accompanying drawing, A A refer to the inside series of overlapping staves, B B to the inside bottom hoop, and C C to the outside series of long staves.

Having thus described my invention, what I claim is—

The stave basket, having an inside lining, A, composed of a series of short staves which overlap each other along one of their edges, each alternate stave of such series terminating under the bottom hoop B and the others extending beyond such point and terminating just within or near said hoop, in combination with an outside series of staves extending from the top on one side across the bottom to the top on the other side, substantially as described.

HORACE C. JONES.

Witnesses:
 B. W. SCHERMERHORN,
 O. L. JORDAN.